April 2, 1963 S. C. RETHORST 3,083,936
AIRCRAFT
Filed Feb. 18, 1959 4 Sheets-Sheet 1
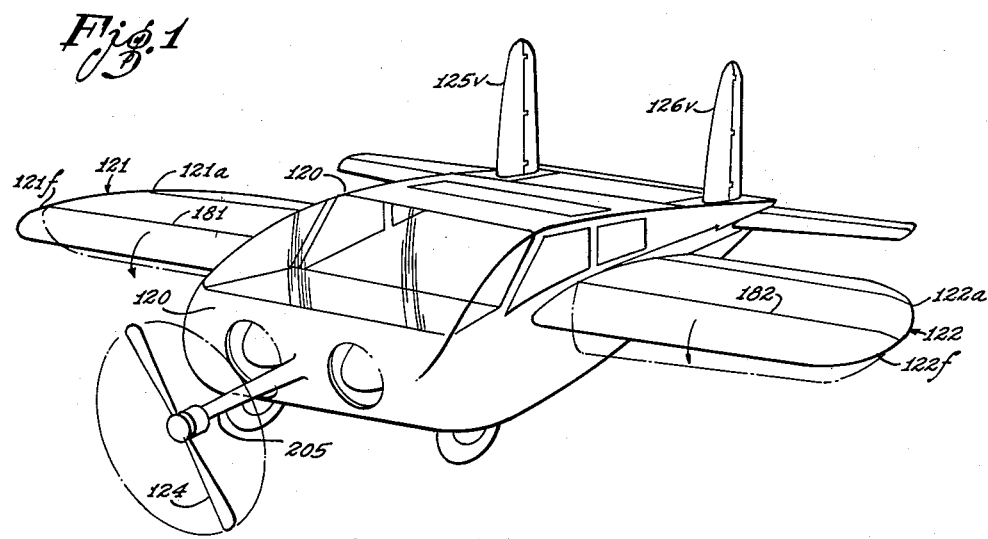
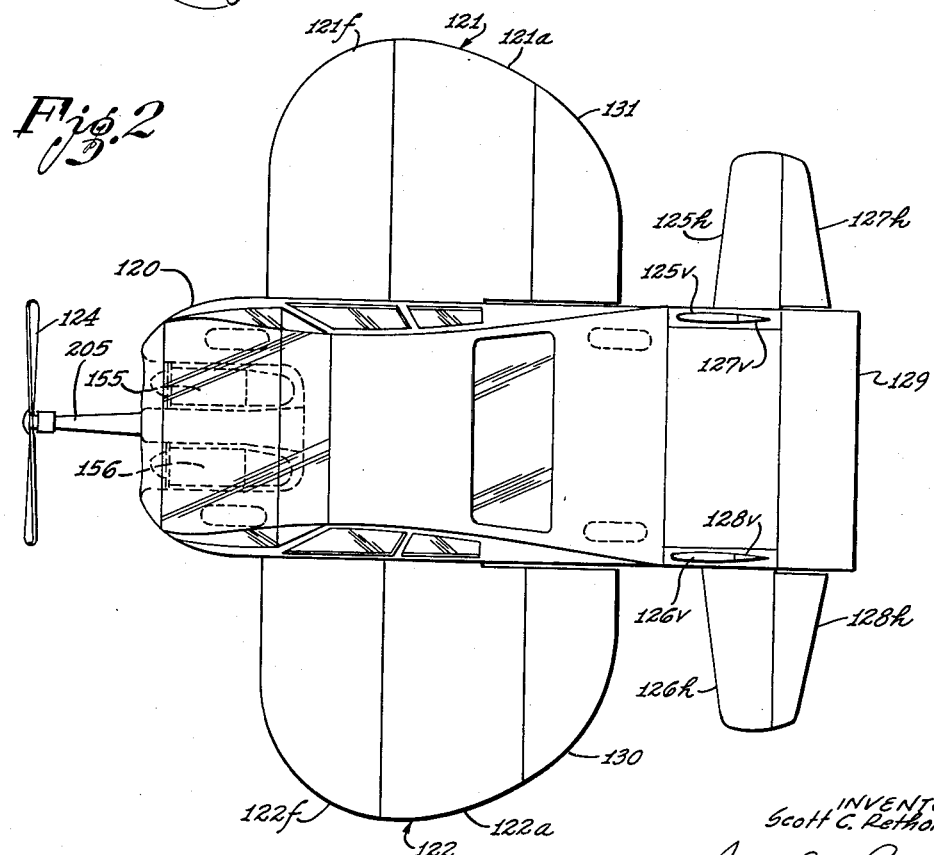
INVENTOR
Scott C. Rethorst
By Smyth & Roston
Attorneys April 2, 1963
S. C. RETHORST
3,083,936
AIRCRAFT
Filed Feb. 18, 1959
4 Sheets-Sheet 2
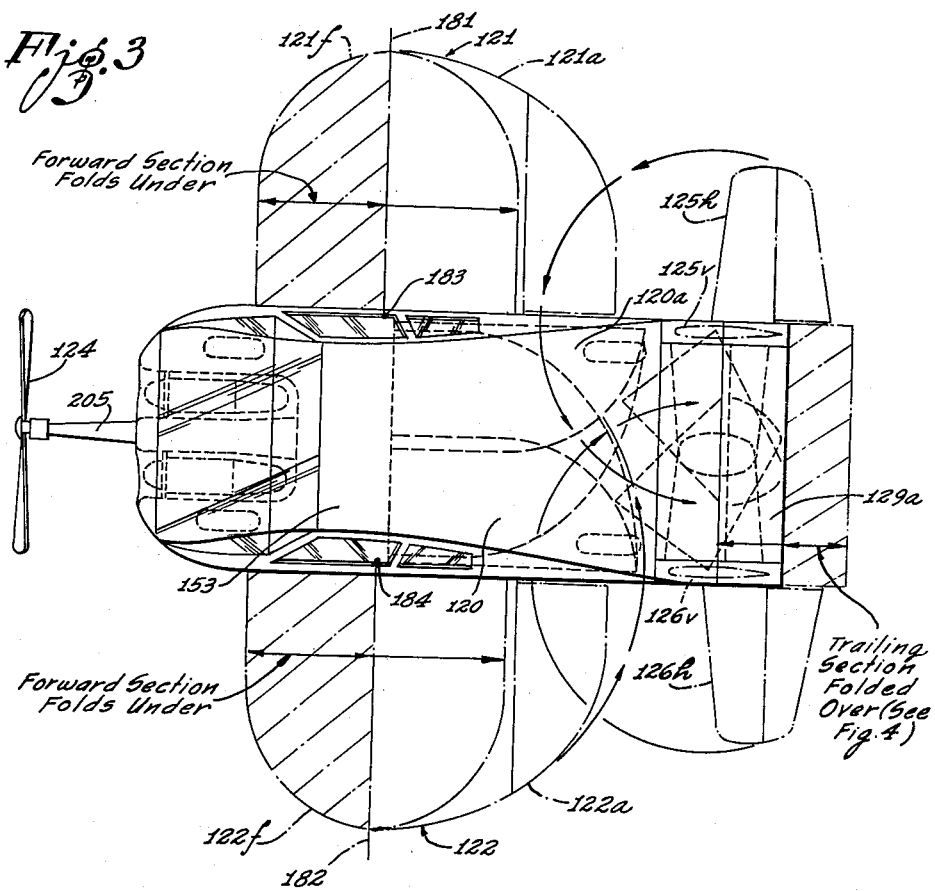
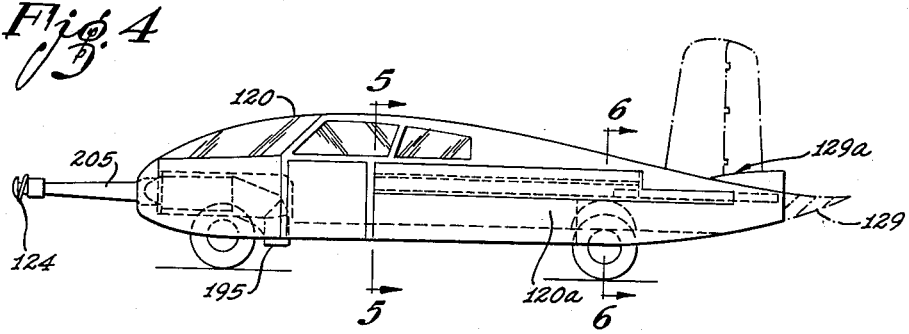
INVENTOR:
Scott C. Rethorst
Attorneys April 2, 1963  S. C. RETHORST  3,083,936
AIRCRAFT Filed Feb. 18, 1959  4 Sheets-Sheet 3

INVENTOR:
Scott C. Rethorst
By Smyth & Roston
Attorneys

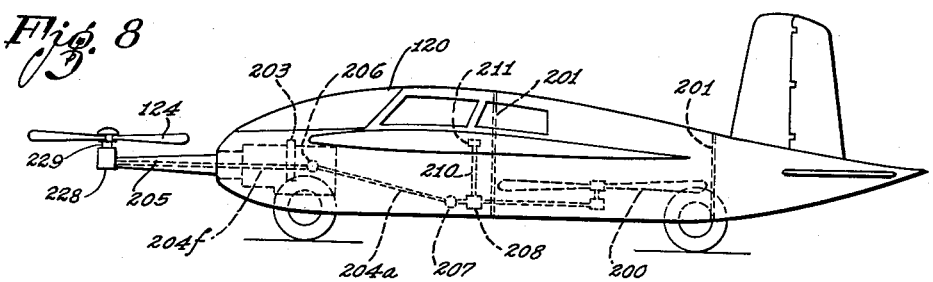
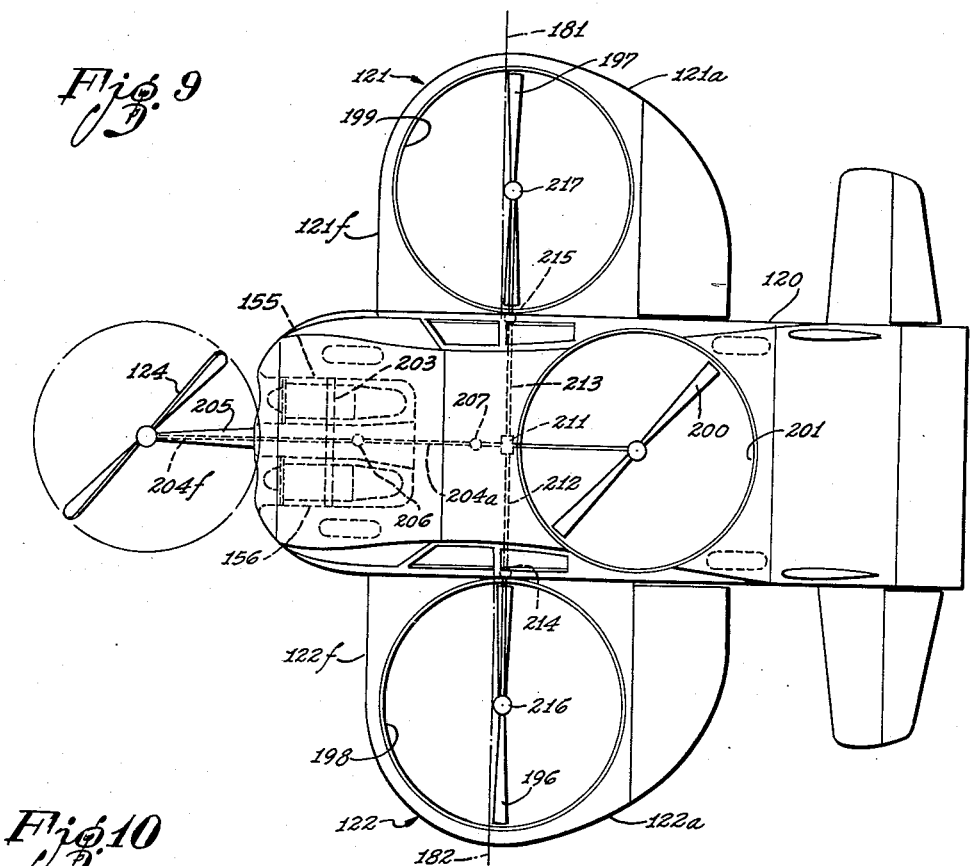
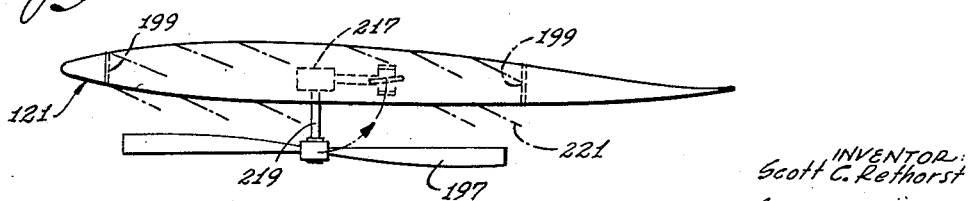

United States Patent Office 3,083,936  
Patented Apr. 2, 1963

3,083,936  
AIRCRAFT  
Scott C. Rethorst, 1661 Lombardy Road, Pasadena, Calif.  
Filed Feb. 18, 1959, Ser. No. 794,004  
24 Claims. (Cl. 244—49)

This invention relates to improvements in aircraft and has particular reference to an aircraft of compact configuration which was the subject of my prior co-pending application Serial No. 689,623 filed October 11, 1957, now abandoned of which this application is a continuation-in-part.

The aircraft of the present invention is particularly adapted to situations where limitations are imposed on the vehicle width by the external environment when the vehicle is not in flight, such as when the vehicle is required to be carried within the fuselage of large cargo aircraft or to operate on highways.

More particularly, the invention relates to an aircraft of the modified flying wing type having a low aspect ratio fuselage to provide a compact configuration, with propulsion arrangements in novel combination with this compact configuration of the aircraft such as to achieve short or vertical take-off and landing performance, including a tilting forward propeller for improved transition between vertical and translational flight. At the same time, the unique compact configuration of the aircraft and the novel disposition of the propulsion arrangements therein enables its contraction to dimensions that will permit its portage in cargo aircraft and travel on the ground over public highways.

The desirable objective of an inherently compact aircraft that can operate under the span limitations of cargo aircraft portage or travel along the ground over public highways without folding, movable, or removable wings is apparent. Such a highly useful aircraft was disclosed in my prior Patent No. 2,561,291.

The improvement described in my prior Patent No. 2,681,773 is directed essentially to the addition of stub wings, which are extendable for increased span, and yet may be so folded as to retain the essential advantages of an inherently compact aircraft.

The further improvement offered in my Patent No. 2,811,323 consists essentially of an improved means of mounting and proportioning stub wings in conjunction with the fuselage so that, when the vehicle is to travel on the highways, the stub wings may be retracted completely within the automotive configuration of the vehicle in such a manner as to be altogether removed from view and from the elements. It is a further object to retract the stub wings in such manner that the vehicle affords many features of an automobile, such as side door access and all-round visibility.

The subsequent improvement offered in my co-pending application Serial No. 689,623 filed October 11, 1957 was the inclusion of horizontally disposed propellers or ducted fans in both the wings and the fuselage to provide vertical take-off. These propellers were arranged in such a way as to permit the vehicle to achieve after take-off a transition to conventional fixed wing sustained forward flight, and also to achieve after landing its more compact configuration by means of a major simplification of the wing structure whereby both the fore and aft stub wing sections were mounted and retracted into the fuselage through the use of a single hinge.

Of these horizontally disposed engine driven propellers, one was mounted in a duct in each of the stub wings, each such propeller having two blades and being located in the leading edge of the aft section of one of the two stub wings, so that when these propellers were stopped in spanwise positions they would not interfere with the retraction of the stub wings. If desired, a further propeller was mounted horizontally in the fuselage.

The present application continues the invention in part by adding one or more further propellers at the forward end of the fuselage forward of the center of gravity mounted so as to tilt or rotate from a horizontal plane for vertical flight to a vertical plane for forward flight.

It is, therefore, an object of this continuing invention to provide essentially four horizontally disposed engine driven propellers in this aircraft, one mounted as heretofore described in each of the stub wings, one mounted in a duct in the fuselage aft of the center of gravity, and one mounted on the forward end of the fuselage forward of the center of gravity in such a manner as to rotate to a vertical plane for forward flight.

A further object of this continuing invention is to provide a major simplification of the structure required to achieve the objectives heretofore cited for the prior application by providing a hinge arrangement for the stub wings such that both the fore and aft stub wing sections on one side of the vehicle may be retracted through the use of a single simplified pivot hinge connection to the central body.

A still further object of this continuing invention is to provide stub wings having such taper in both the spanwise and chordwise directions, together with such airfoil shape in section, combined with the aforementioned simplified hinge connection to the central body, that the stub wings may retract into nested positions occupying a minimum of space in the vehicle body.

An additional object of the continuing invention is to provide stub wings of such shape in plan form in combination with the central body as to attain the maximum wing area and span possible within the retraction requirements and width and length limitations of the central airfoil body.

Another object of the continuing invention is to provide tail surfaces of such relative size, shape and disposition that they may provide independent yaw, pitch, and roll moments, and yet retract completely within the central airfoil body in a simplified manner.

Yet another object of the continuing invention is the provision of a trailing edge surface at the rear of the central airfoil body which, after folding forward to a position at the aft end of the top of the chassis, may partially or totally collapse so as to provide the pilot with improved visibility to the rear.

Finally, an object of the invention is the proportioning and mounting of a set of aerodynamic surfaces relative to a fuselage so that certain of these surfaces may contain horizontal propellers for vertical flight and at the same time permit all such surfaces to retract within the minimum volume parallelepipedon defined by the fuselage for optimum practical compactness.

The features of my continuing invention will be illustrated in the accompanying drawings and described in the following detailed specification, a certain preferred embodiment being disclosed by way of illustration only.

In the drawings, wherein like numerals refer to like or corresponding parts throughout the several views:

FIGURE 1 is an overall perspective view of a compact aircraft embodying the features of the present invention, and showing the aircraft in normal flight;

FIGURE 2 is a top plan view of the aircraft of FIGURE 1;

FIGURE 3 is a schematic plan view showing the manner in which the stub wing and tail sections are retracted;

FIGURE 4 is a side view of the aircraft showing the apertures provided on the side of the fuselage for retracting the stub wings and the horizontal tail surfaces. This view also illustrates the center section trailing edge surface folded forward;

FIGURE 8 is a side view of the aircraft embodying the features of the present invention, illustrating the aircraft in its vertical flight configuration;

FIGURE 9 is a plan view of the aircraft embodying the features of the present invention, illustrating for vertical flight ducted fan propulsion, with a ducted propeller mounted in each of the stub wings and in the fuselage, and with the forward propeller horizontally disposed for vertical flight;

FIGURE 10 is a side view of the right stub wing, illustrating the propeller mounted below its wing duct.

Figure 5:
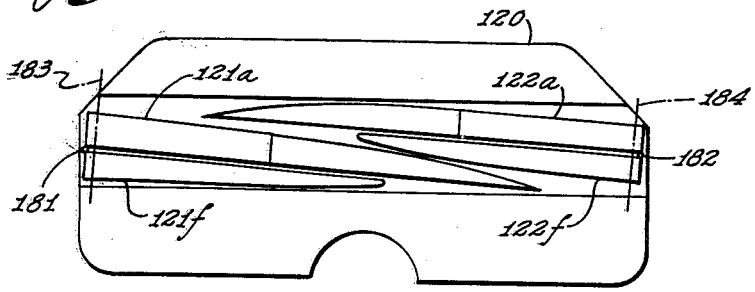
FIGURE 5 is a front section view taken along the line 5—5 of FIGURE 4, showing the nested stacking arrangement provided by the forward stub wing sections folding under, by the canted hinge lines, and by chordwise taper of the stub wings themselves.

Referring now to the drawings in more detail, and referring in particular to FIGURE 1, there is illustrated a flying wing type aircraft in accordance with the present invention comprising a main body, chassis, or fuselage 120 substantially of airfoil shape, on the sides of which are mounted two stub wings, or supplementary airfoils, 121 and 122. These stub wings consist of fore and aft sections, designated 121f, 121a, 122f, and 122a, respectively.

In the preferred embodiment of the invention which I have illustrated two engines of any conventional type, such as reciprocating or gas turbine, designated by reference numerals 155 and 156, are mounted on the chassis at the leading edge thereof as illustrated in FIGURE 2.

Figure 6:
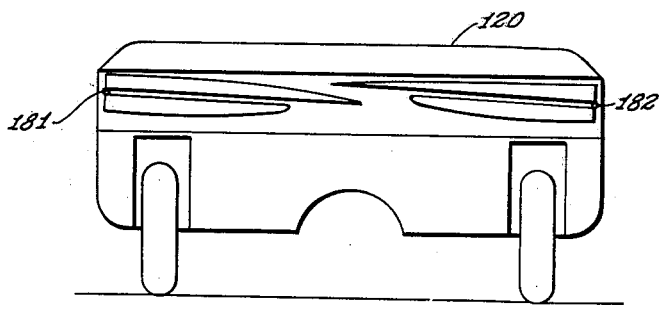
FIGURE 6 is a front section view taken along the line 6—6 of FIGURE 4, showing the smaller size of stub wings at this station due to spanwise taper.

The stub wings 121, 122 are mounted on the center airfoil 120 along a longitudinal line so that to provide a more compact configuration they may be retracted into the space 120a aft of the pilot's compartment 153 (FIGURES 3 and 4) and substantially forward of the flight position of the tail structure 125h, 125v, 126h, and 126v. To accomplish this retraction, the forward sections 121f and 122f first fold under their respective aft sections 121a and 122a around transverse hinge lines 181 and 182 joining the sections. Second, the aft sections 121a and 122a then swing into the storage compartment 120a about canted hinge lines 183 and 184 (FIGURE 5) constituting pivot points located at the corners of the stub wing sections at the inboard end of the transverse lines 181 and 182 along which the fore and aft sections are joined. The canted hinge lines 183 and 184 achieve in a simple pivot hinge the nesting of these folded double stub wings desirable to minimize storage space, as illustrated in FIGURES 4, 5, and 6.

This arrangement of the stub wings permits the employment of substantial wing area, achieved in spite of the limitations on span, through the use of a substantial stub wing chord along its inboard edge. In the embodiment illustrated in FIGURE 1, the relative geometrical and mounting provisions disclosed herein permit the usage of an extensive inboard edge of the stub wings, as the inboard edge of each sub stub wing section is then limited only by the width of the fuselage which contains it. Thus, when in the extended position, this inboard edge of the stub wing may extend through a substantial portion of the central airfoil body, that is, the basic structure on which is mounted the movable surfaces, such as the stub wings 121, 122, the horizontal tail 125h, 126h, the vertical tail 125v, 126v, and the trailing edge surface 129.

Stabilizing and control surfaces mounted on the aircraft, as shown in FIGURE 2, include a horizontal tail consisting of a right and left fixed surface 125h and 126h, respectively, on whose trailing edges are attached movable surfaces 127h and 128h. The fixed surfaces are mounted at an angle of incidence such that the aerodynamic force so provided varies with the angle of attack in such a manner as to provide adequate longitudinal stability. The movable elevators 127h and 128h provide longitudinal control. Also included is a vertical tail consisting of a right and left fixed surface 125v and 126v, respectively, on whose trailing edges are attached movable surfaces 127v and 128v. The fixed surfaces are mounted such that the aerodynamic force so provided varies with the angle of yaw in such a manner as to provide adequate directional stability. The movable rudders 127v and 128v provide directional control.

A movable trailing edge surface 129 is provided as part of the tail structure to balance the airfoil and give the required trim under the varying power and loading conditions that may be employed in the operation of the aircraft.

Also as indicated in FIGURE 2, flaperons 131 and 130 are mounted at the trailing edge of stub wing sections 121a and 122a, respectively. These surfaces, if lowered together, act as flaps to increase the wing lift, and if operated differentially act as ailerons to provide rolling moments for lateral control.

The horizontal tail surfaces 125h, 126h (including their trailing edge segments 127h, 128h) are swung inboard about pivot points located at their forward inboard corners in the same manner as employed for the stub wings, as illustrated in FIGURE 3.

Figure 7:
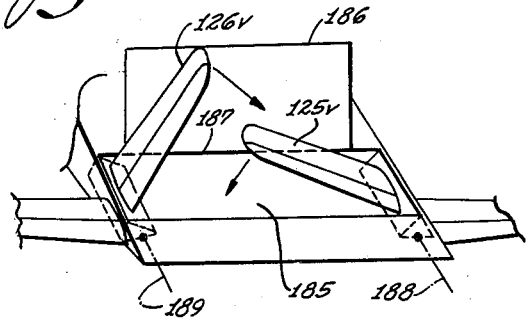
FIGURE 7 is a perspective view of the vertical tail surfaces during their retraction, showing the surfaces folding inboard and down, one above the other, into a compartment provided by raising a forward door.

The vertical tail surfaces 125v, 126v (including their trailing edge segments 127v, 128v) are retracted into a compartment 185 (see FIGURE 7) exposed by a door 186 swinging up and open about a forward transverse hinge line 187. These surfaces are folded inboard and down, one above the other, about longitudinal hinge lines 188, 189 (for the right and left surfaces, respectively) located below the upper surface of the fuselage 120. Closing of the door 186 covers the retracted surfaces, leaving the top of the fuselage 120 flush.

The retraction of wing and tail surfaces as thus described is illustrated in FIGURE 3. As shown in this plan view, these several surfaces all retract into the storage compartment 120a aft of the pilot's compartment, where the mounting provisions described, together with the relative proportioning of the several elements, achieves a very high ratio of aerodynamic surface area to the volume of storage space required. FIGURE 4, together with its front section views of FIGURES 5 and 6, further illustrate the compact nesting of the several surfaces.

Also, for portage or ground operation of the vehicle, the trailing edge surface 129 folds forward to the position 129a as shown in FIGURE 4. This folding removes this lightly constructed and critical aerodynamic surface 129 from its posterior location vulnerable to traffic damage and exposes instead the more rugged aft end of the chassis to protect the rear of the vehicle. The surface 129 itself in folding to 129a is then protected forward of and above the bumper line.

The interior arrangement of the vehicle may be as illustrated in FIGURES 3 and 4. As shown particularly in FIGURE 4, a relatively thick airfoil section is employed for the center fuselage in order to provide adequate space to house both passengers and engines. FIGURE 3 illustrates the engines in the forward compartment and the passengers aft thereof. This arrangement is shown simply to illustrate that the vehicle is operable, but of course the precise arrangement of the engines and passengers is immaterial to the invention, and for example, may be interchanged if desirable for purposes of balance and visibility.

FIGURE 8 illustrates an engine driven propeller 124 mounted horizontally on the leading edge of the fuselage 120 for vertical flight.

FIGURE 9 illustrates engine driven propellers or rotors 196 and 197 mounted horizontally in ducts (hence sometimes called ducted fans) 198 and 199 in the left and right stub wings 122 and 121, respectively. These two bladed propellers are mounted in the leading edge of the aft stub wing sections 122a and 121a, and when the propellers are stopped in positions parallel to the hinge lines 182 and 181, thus lying totally in the aft stub wing sections, the forward stub wing sections, 122f and 121f, may fold under and the retraction proceed as heretofore described.

In mounting horizontal propellers in ducts in the wings, the propellers may be coplanar with the wing, that is, the propellers may actually be contained within the wing, or they may lie in a plane external to but in the proximity of and parallel to that of the wing. In either case, such propellers are referred to in this specification as mounted in the wing or in ducts in the wing, as the propellers are structurally mounted on the wing and the air flow to the propeller may be through an adjacent coaxial duct in the wing. When the propellers are actually contained within a wing duct, they may consist of any number of blades, consistent with the wing retraction provisions provided, and so be considered as fans. When the propellers are external to the wing, the number and now also the size of blades is restrained only by compatibility with any propeller and wing retraction provisions that are employed, which will limit the blades to two and the diameter to the span of the wing panel if the propeller or rotor is simply swung adjacent to the wing surface in retracting. In any event such propellers, fans, or rotors are for simplicity termed propellers in this specification.

When the propellers are external to the wing, no duct is required and the restraints on the wing size to contain the propeller are removed. The wing chord may then be made much smaller, thus permitting the duct to be omitted and the smaller wing allowing the air to flow around the wing into the propeller. Such a smaller wing may then be made in one piece, thus eliminating the necessity of providing a forward panel which folds under the aft panel to retract, thus simplifying the structure.

FIGURE 10 illustrates the right stub wing 121 with its propeller 197 mounted below its duct 199. After the propellers are stopped, but prior to the retraction at the stub wings as described, the shafts on which these propellers are mounted are swung up into the plane of the wing, locating the propellers within their respective ducts. The upper and lower surfaces of the duct are closed over with slats 221, as illustrated in FIGURE 10, said slats opening to permit air to flow through the duct when the propeller is operating, and closing to form a flush wing surface when in forward flight.

A third propeller 200 is mounted horizontally in the fuselage 120 in a duct 201, located aft of the wing mounted propellers 196 and 197, and aft of the center of gravity.

This propeller 200 is located at the bottom of the fuselage 120, as shown in FIGURE 8. When this propeller is operating the duct 201 extends through the entire depth of the fuselage 120. However, this duct 201 is constructed of several telescopic sections, which collapse to the bottom of the fuselage 120 when required for the stub wings 121 and 122 and the horizontal stabilizers 125h and 126h to retract above the propeller 200, as shown in FIGURE 4.

The fourth propeller 124 is mounted on the forward end of the fuselage 120 forward of the center of gravity. FIGURE 8 illustrates this propeller in its horizontal position for vertical flight.

The fuselage propellers thus mounted both fore and aft of the center of gravity, and the wing propellers mounted laterally to either side of the center of gravity, provide longitudinal and lateral control, respectively, in vertical flight by selective variation of the thrust from each of the propellers, by control of either power, r.p.m., or pitch of the propellers.

For forward flight, the forward propeller 124 is rotated from its horizontal position of FIGURES 8 and 9 to its vertical position of FIGURES 1 and 2. At the same time, after fixed wing flight speed is attained, the two wing propellers 196 and 197, and the aft fuselage propeller 200, are declutched and stopped, their respective ducts 198 and 199 in the wings, and 201 in the fuselage, being covered over with slats, forming smooth wing and fuselage surfaces for conventional fixed wing sustained forward flight.

As illustrated in FIGURES 8, 9 and 10, the two engines 155 and 156 are joined by an engine gear box 203 which preferably is built as an integral part of the said two engines, and hence is common to both of them. Said gear box 203, being located between said engines, is unobstructed fore and aft. Hence from said gear box 203 a power shaft 204f runs forward through a supporting boom 205 to a forward gear box 228 from which an output shaft 229 extends, having mounted thereon the forward propeller 124. The forward gear box 228 is split in a vertical plane, with the portion of the gear box on one side of the split attached rigidly to the boom 205, and the portion of said gear box on the other side of the split containing the output shaft 229 on which is mounted the propeller 124 arranged to rotate so as to tilt the said propeller to either a vertical or horizontal plane. Such a gear box arrangement is well known and is illustrated for example in FIGURE 29 on page 147 of the December 1952 issue of Machine Design.

A power shaft 204a similarly extends aft from the engine gear box 203.

Universal joints 206 and 207 transmit the aft power to a gear box 208, from which power is transmitted further aft to the rear propeller 200 through the shaft 209, both this latter propeller and its shaft lying below the region into which the wings 121 and 122 and the horizontal stabilizers 125h and 126h retract.

Also from the gear box 208 power is transmitted vertically through a shaft 210 to a gear box 211, lying in the plane of the stub wings 121 and 122. From the gear box 211, a shaft 213 runs spanwise to a gear box 217 mounted in the center of the duct 199 located in the right wing 121, incorporating the universal joint 215 at the wing hinge 183, which permits the wing 121 to retract as heretofore described. A shaft 219 then extends from the gear box 217 vertically down to the propeller 197. A similar shaft 212 runs spanwise to the gear box 216 mounted in the center of the duct 198 in the left wing 122, incorporating a universal joint 214 at the wing hinge 184. A shaft 218 then extends from the gear box 216 vertically down to the propeller 196.

From the foregoing detailed description, it will be apparent that this continuing invention provides an aircraft of a unique compact configuration having its elements disposed in such a novel manner as to enable its contraction in a particularly simple manner to dimensions that will permit its portage in cargo aircraft and travel on the ground over public highways. The novel configuration of the aircraft at the same time achieves improved short or vertical take-off and landing performance.

The preceding detailed description discloses the basic structure of this continuing invention of compact aircraft. It will readily occur to one skilled in the aircraft design art, upon studying the specification and the annexed drawings, to design aircraft of different dimensions and configurations but nevertheless utilizing the principles of my invention herein taught.

Thus, while a preferred form and method of employing the invention have been disclosed in detail, it is to be understood that the invention lends itself to numerous variations without departing from the basic principles on the scope of the appended claims.

Having thus described my invention, what I claim as novel and desire to secure by Letters Patent of the United States is:

1. An aircraft, said aircraft comprising a fuselage, said fuselage including a forward compartment for occupancy and an aft storage compartment and having landing surface engaging elements extending therefrom, a pair of airfoils each pivotally mounted on the fuselage at one side thereof for swinging movement between an extended position and a retracted position within the storage compartment, at least one propeller mounted in each of said airfoils in a plane substantially parallel to the plane of said airfoils to provide vertical take-off, a propeller mounted horizontally in the fuselage aft of the center of gravity, and a propeller mounted at the forward end of the fuselage forward of the center of gravity, the last said propeller being rotatable between a horizontal plane for vertical take-off and a vertical plane for forward flight.

2. An aircraft as defined in claim 1, said aircraft having, in addition, at the after extremity of at least a portion of said fuselage, controllably variable tail surface means adapted to provide yawing and pitching moments for flight control, and means to retract said tail surface means to a position substantially within the overall configuration of the fuselage aft of the pilot's compartment.

3. An aircraft, said aircraft comprising a fuselage, said fuselage having a storage compartment, and a pair of airfoils each pivotally mounted on the fuselage at one side thereof for swinging movement between an extended position and a retracted position within the storage compartment, each said airfoil having mounted thereon a propeller of diameter not exceeding the airfoil extension beyond the fuselage.

4. An aircraft, said aircraft comprising a fuselage, said fuselage having a storage compartment, a pair of airfoils each pivotally mounted on the fuselage at one side thereof for swinging movement between an extended position and a retracted position within the storage compartment, and at least one propeller located forward of the center of gravity a distance greater than its radius and mounted so as to operate both in the plane of the wings and perpendicular thereto.

5. An aircraft, said aircraft comprising a fuselage, said fuselage having a storage compartment, a pair of airfoils each pivotally mounted on the fuselage at one side thereof for swinging movement between an extended position and a retracted position within the storage compartment, and at least one propeller horizontally disposed within said fuselage aft of the center of gravity a distance greater than its radius.

6. An aircraft, said aircraft comprising a fuselage, said fuselage having a storage compartment, and a pair of airfoils each pivotally mounted on the fuselage at one side thereof for swinging movement between an extended position and a retracted position within the storage compartment, and a propeller arrangement having a horizontally disposed disc area for vertical flight at least twice its vertically disposed disc area for forward flight.

7. An aircraft, said aircraft comprising a fuselage, said fuselage having a storage compartment, a pair of airfoils each pivotally mounted on the fuselage at one side thereof for swinging movement between an extended position and a retracting position within the storage compartment, and a horizontally disposed propeller arrangement for vertical flight, at least one such propeller fore and one aft of the center of gravity, and at least one such propeller laterally on said airfoils to either side of the center of gravity.

8. An aircraft, said aircraft comprising a fuselage, said fuselage including a forward compartment for occupancy and an aft storage compartment and having landing surface engaging elements extending therefrom, and a pair of airfoils each pivotally mounted on the chassis at one side thereof for swinging movement between extended and retracted positions, said airfoils each having a forward and an aft panel, and a spanwise hinge axis about which the forward panel is folded against the aft panel when in said retracted position, said pivotal mountings each having a hinge line disposed other than normal to the plane of said airfoils when in the extended position so that said airfoils will swing when retracted into nested positions within the storage compartment.

9. An aircraft, said aircraft comprising a fuselage, said fuselage having a storage compartment, a pair of airfoils each pivotally mounted on the fuselage at one side thereof for swinging movement between an extended position and a retracted position within the storage compartment, and a plurality of propellers horizontally disposed for vertical flight, at least one of said propellers being alternatively operable in a vertical plane for forward flight, the remaining propellers being then retractable into said fuselage.

10. An aircraft, said aircraft comprising a fuselage, said fuselage having a storage compartment, a pair of airfoils each pivotally mounted on the fuselage at one side thereof for swinging movement between an extended position and a retractable position within the storage compartment, and a horizontally disposed propeller arrangement for vertical flight, at least one such propeller laterally on said airfoils, to either side of the center of gravity, and at least one such propeller aft and one fore of the center of gravity, the propeller means forward of the center of gravity being alternatively operable in a vertical plane for forward flight.

11. An aircraft, said aircraft comprising a fuselage, said fuselage having a storage compartment, a pair of airfoils each pivotally mounted on the fuselage at one side thereof for swinging movement between an extended position and a retracted position within the storage compartment, each said airfoil having mounted thereon a horizontally disposed propeller for vertical flight, and a propeller means mounted forward of the center of gravity which is alternatively operable in horizontal and vertical planes.

12. An aircraft, said aircraft comprising a fuselage, a set of aerodynamic surfaces mounted on said fuselage for swinging movement between an extended position and a retracted position within the minimum volume parallelepipedon determined by the maximum dimensions of said fuselage, and propulsive means disposable alternatively to provide thrust upward in vertical flight and thrust forward in forward flight.

13. An aircraft, said aircraft comprising a chassis, said chassis including a forward compartment for occupancy and an aft storage compartment and having landing surface engaging elements extending therefrom, and a pair of airfoils each pivotally mounted on the chassis at one side thereof for swinging movement between an extended position and a retracted position within the storage compartment, said airfoils each having mounted therein at least one propeller in a plane substantially parallel to the plane of said airfoils, to provide vertical take-off.

14. An aircraft, said aircraft comprising a fuselage, said fuselage including a forward compartment for occupancy and an aft storage compartment and having landing surface engaging elements extending therefrom, a pair of airfoils each pivotally mounted on the fuselage at one side thereof for swinging movement between an extended position and a retracted position within the storage compartment, and at least one propeller mounted in each of said airfoils and in the fuselage in a plane substantially parallel to the plane of said airfoils, to provide vertical take-off.

15. An aircraft, said aircraft comprising a fuselage, said fuselage including a forward compartment for occupancy and an aft storage compartment and having landing surface engaging elements extending therefrom, a pair of airfoils each pivotally mounted on the fuselage at one side thereof for swinging movement between an extended position and a retracted position within the storage compartment, and at least one propeller mounted in said storage compartment and in each of said airfoils in a plane substantially parallel to the plane of said airfoils, to provide vertical take-off.

16. An aircraft, said aircraft comprising a fuselage, said fuselage including a forward compartment for occupancy and an aft storage compartment and having landing surface engaging elements extending therefrom, a pair of airfoils each pivotally mounted on the fuselage at one side thereof for swinging movement between an extended position and a retracted position within the storage compartment, and at least one propeller mounted in the storage compartment in a plane substantially parallel to the plane of the airfoils to provide vertical take-off.

17. An aircraft, said aircraft comprising a fuselage, said fuselage including a forward compartment for occupancy and an aft storage compartment and having landing surface engaging elements extending therefrom, a pair of airfoils each pivotally mounted on the fuselage at one side thereof for swinging movement between an extended position and a retracted position within the storage compartment, and at least one propeller so mounted in the storage compartment as to be capable of operating in a plane substantially parallel to the plane of the airfoils.

18. An aircraft, said aircraft comprising a fuselage, said fuselage having a storage compartment and having landing surface engaging elements extending therefrom, and a set of aerodynamic surfaces mounted on said fuselage for swinging movement between an extended position and a retracted position within said storage compartment, at least one of said aerodynamic surfaces containing at least one horizontally disposed propeller to provide vertical take-off.

19. An aircraft, said aircraft comprising a fuselage, said fuselage including a forward compartment for occupancy and an aft storage compartment and having landing surface engaging elements extending therefrom, and a set of aerodynamic surfaces mounted on said fuselage for swinging movement between an extended position and a retracted position either within or adjacent to said storage compartment, at least one of said aerodynamic surfaces containing at least one horizontally disposed propeller to provide vertical take-off.

20. An aircraft, said aircraft comprising a fuselage, said fuselage having a storage compartment, and a pair of airfoils each pivotally mounted on the fuselage at one side thereof for swinging movement between an extended position and a retracted position within the storage compartment, each said airfoil having mounted therein at least one propeller in a plane substantially parallel to the plane of said airfoils, to provide vertical take-off.

21. An aircraft, said aircraft comprising a fuselage, said fuselage having a storage compartment, and a set of aerodynamic surfaces mounted on said fuselage for swinging movement between an extended position and a retracted position within the minimum volume parallelepipedon determined by the maximum dimensions of said fuselage, said storage compartment containing at least one propeller mounted in a plane substantially parallel to the plane of the aerodynamic surfaces to provide vertical take-off.

22. An aircraft, said aircraft comprising a fuselage, said fuselage having a storage compartment, and a set of aerodynamic surfaces mounted on said fuselage for swinging movement between an extended position and a retracted position within the minimum volume parallelepipedon determined by the maximum dimensions of said fuselage, at least one of said aerodynamic surfaces containing at least one horizontally disposed propeller to provide vertical take-off.

23. An aircraft, said aircraft comprising a fuselage, said fuselage having a storage compartment, a propeller aperture arrangement in said fuselage to propel air downward to provide vertical take-off, and a set of aerodynamic surfaces mounted on said fuselage for swinging movement between an extended position exposing said aperture and a retracted position within said storage compartment covering said aperture.

24. An aircraft, said aircraft comprising a fuselage and a set of aerodynamic surfaces mounted on said fuselage for swinging movement between an extended position and a retracted position within the minimum volume parallelepipedon determined by the maximum dimensions of said fuselage, at least one of said aerodynamic surfaces containing at least one horizontally disposed propeller to provide vertical take-off.

References Cited in the file of this patent

UNITED STATES PATENTS

| | | |
|---|---|---|
| 1,730,249 | Smith | Oct. 1, 1929 |
| 1,773,361 | Just | Aug. 19, 1930 |
| 1,783,458 | Windsor | Dec. 2, 1930 |
| 1,875,891 | Salisbury | Sept. 9, 1932 |
| 2,097,990 | Sikorsky | Nov. 2, 1937 |
| 2,158,598 | Watter | May 16, 1939 |
| 2,363,129 | Heitmann | Nov. 21, 1944 |
| 2,410,239 | Roe | Oct. 29, 1946 |
| 2,423,095 | Gobson | July 1, 1947 |
| 2,423,625 | Smith | July 8, 1947 |
| 2,734,701 | Horton | Feb. 14, 1956 |
| 2,767,939 | Taylor | Oct. 23, 1956 |
| 2,811,323 | Rethorst | Oct. 29, 1957 |
| 2,825,514 | Focke | Mar. 4, 1958 |

FOREIGN PATENTS

| | | |
|---|---|---|
| 372,344 | Great Britain | Apr. 29, 1932 |
| 810,054 | France | Dec. 19, 1936 |
| 816,813 | France | May 10, 1937 |
| 508,367 | Great Britain | June 27, 1939 |
| 409,188 | Italy | Feb. 7, 1945 |